(12) United States Patent
Ciarelli et al.

(10) Patent No.: US 9,427,871 B2
(45) Date of Patent: Aug. 30, 2016

(54) HUMAN SAFETY PROVISION IN MOBILE AUTOMATION ENVIRONMENTS

(71) Applicant: ABB Technology AG, Zurich (CH)

(72) Inventors: Gary Ciarelli, Milford, MI (US); Srinivas Nidamarthi, Auburn Hills, MI (US)

(73) Assignee: ABB TECHNOLOGY AG, Zurich (CH)

( * ) Notice: Subject to any disclaimer, the term of this patent is extended or adjusted under 35 U.S.C. 154(b) by 0 days.

(21) Appl. No.: 14/265,701

(22) Filed: Apr. 30, 2014

(65) Prior Publication Data
US 2014/0330433 A1 Nov. 6, 2014

Related U.S. Application Data

(60) Provisional application No. 61/819,921, filed on May 6, 2013.

(51) Int. Cl.
*G06F 19/00* (2011.01)
*B25J 9/16* (2006.01)
*F16P 3/14* (2006.01)

(52) U.S. Cl.
CPC ............... *B25J 9/1676* (2013.01); *F16P 3/14* (2013.01); *G05B 2219/40203* (2013.01); *G05B 2219/40298* (2013.01); *G05B 2219/40475* (2013.01); *G05B 2219/45067* (2013.01);
(Continued)

(58) Field of Classification Search
CPC .................. B25J 9/1676; G05B 2219/40203; G05B 2219/40475; G05B 2219/40298; G05B 2219/45067; G05B 2219/49152; G05B 2219/49141; Y10S 901/46; Y10S 901/01

USPC ............... 700/245, 250, 255, 257, 258, 259; 318/567, 568.11, 568.12, 568.13, 318/568.14, 568.16, 568.18
See application file for complete search history.

(56) References Cited

U.S. PATENT DOCUMENTS 5,758,298 A  5/1998 Guldner
5,956,465 A  9/1999 Takagi et al.
(Continued)

FOREIGN PATENT DOCUMENTS

JP  2010176203 A  8/2010
WO  2008095581 A2  8/2008
(Continued)

OTHER PUBLICATIONS

Extended European Search Report; Application No. EP 14166715; Dec. 11, 2014.

*Primary Examiner* — Jaime Figueroa
(74) *Attorney, Agent, or Firm* — Taft Stettinus & Hollister LLP (57) ABSTRACT

A computer-implemented system and method for operating mobile automated workstations in a workspace including a workpiece is disclosed. A computer device defines an exclusionary volume having an outer exclusionary surface at least partially surrounding a mobile workstation that is operably disposed in the workspace. The computer device receives data from at least one sensor and determines the location of the workstation and humans within the workspace based on the data. The computer device activates an indicator and alters the motion of the workstation after detection of a human breaching the exclusionary volume or exclusionary surface.

20 Claims, 3 Drawing Sheets

(52) U.S. Cl.
CPC ... *G05B 2219/49152* (2013.01); *Y10S 901/01* (2013.01); *Y10S 901/46* (2013.01)

(56) References Cited

U.S. PATENT DOCUMENTS

| | | | |
|---|---|---|---|
| 6,393,362 B1 * | 5/2002 | Burns | 701/301 |
| 7,768,549 B2 | 8/2010 | Cofer | |
| 7,778,732 B2 | 8/2010 | Adachi et al. | |
| 7,783,386 B2 * | 8/2010 | Merte et al. | 700/255 |
| 8,054,027 B2 * | 11/2011 | Nihei et al. | 318/568.11 |
| 8,154,590 B2 | 4/2012 | Kressel et al. | |
| 8,209,074 B2 | 6/2012 | Sonoura | |
| 8,249,747 B2 * | 8/2012 | Kock | B25J 9/1676 318/568.11 |
| 8,271,132 B2 | 9/2012 | Nielsen et al. | |
| 8,315,735 B2 * | 11/2012 | Nihei et al. | 700/245 |
| 8,812,159 B2 * | 8/2014 | Maehara et al. | 700/255 |
| 8,816,874 B2 * | 8/2014 | Sato | B25J 9/1674 340/686.1 |
| 8,855,815 B2 * | 10/2014 | Mizutani | 700/245 |
| 9,030,332 B2 * | 5/2015 | Tafazoli Bilandi et al. | 340/686.1 |
| 9,043,025 B2 * | 5/2015 | Brooks | B25J 9/1676 700/245 |
| 2003/0176947 A1 * | 9/2003 | Estkowski | G05D 1/0242 700/245 |
| 2004/0249508 A1 * | 12/2004 | Suita et al. | 700/245 |
| 2005/0222713 A1 * | 10/2005 | Kawabe et al. | 700/259 |
| 2006/0049939 A1 * | 3/2006 | Haberer | F16P 3/14 340/541 |
| 2008/0021597 A1 * | 1/2008 | Merte et al. | 700/255 |
| 2008/0161970 A1 * | 7/2008 | Adachi | B25J 9/0003 700/253 |
| 2009/0043440 A1 * | 2/2009 | Matsukawa et al. | 701/25 |
| 2009/0171505 A1 * | 7/2009 | Okazaki | B25J 9/1676 700/258 |
| 2009/0319081 A1 * | 12/2009 | Kock et al. | 700/245 |
| 2010/0114373 A1 * | 5/2010 | Hale et al. | 700/258 |
| 2010/0191372 A1 * | 7/2010 | Nihei et al. | 700/245 |
| 2011/0135429 A1 * | 6/2011 | Machida et al. | 414/222.13 |
| 2011/0224826 A1 * | 9/2011 | Maehara et al. | 700/255 |
| 2012/0012415 A1 * | 1/2012 | Oettinger | 180/272 |
| 2012/0262727 A1 * | 10/2012 | Bonin | B25J 9/1676 356/614 |
| 2012/0290132 A1 * | 11/2012 | Kokubo et al. | 700/255 |

FOREIGN PATENT DOCUMENTS

| | | |
|---|---|---|
| WO | 2010065864 A2 | 6/2010 |
| WO | WO 2010065864 A2 * | 6/2010 |
| WO | 2012076029 A1 | 6/2012 |

\* cited by examiner

HUMAN SAFETY PROVISION IN MOBILE AUTOMATION ENVIRONMENTS

FIELD OF THE INVENTION

The present disclosure relates to systems and methods for protecting humans working in proximity to automated manufacturing machinery.

BACKGROUND

Automated manufacturing such as that occurring on assembly lines can involve a series of workstations implementing robotic systems to perform various manufacturing tasks. Such tasks can include machining, assembly and testing on products that are moved sequentially from one workstation to the next. In addition to automated processes, manual manufacturing processes can be performed by humans during a product's progress through such an assembly line. Humans working on the assembly line can be segregated from areas in which automated tasks are performed, for example by erecting physical barriers that prevent access to areas in which an occupant could be injured by a robot during its operation.

Assembly lines may not be suitable for performing manufacturing processes on large workpieces such as aircraft fuselages and wings, windmill turbines, large watercraft hulls, missile bodies, tanks and other such large workpieces. Instead, mobile workstations that perform manufacturing processes can be moved to various locations proximate to the portions of the large workpieces on which work is to be performed. However, such mobility can increase the risk of injury to any personnel also in the workspace. Further, operation of any robots or machinery included with such a workstation can pose unacceptable risk to human occupants of the workspace.

BRIEF SUMMARY

A computer-implemented system and method for operating mobile automated workstations in a workspace including a workpiece is disclosed. A computer device defines an exclusionary volume having an outer exclusionary surface at least partially surrounding a mobile workstation that is operably disposed in the workspace. The computer device receives data from at least one sensor and determines the location of the workstation and humans within the workspace based on the data. The computer device activates an indicator and alters the motion of the workstation after detection of a human breaching the exclusionary volume or exclusionary surface.

BRIEF DESCRIPTION OF THE DRAWINGS

In the accompanying drawings, structures and methods are illustrated that, together with the description provided below, describe aspects of a system and method for providing human safety in mobile automation environments. It will be noted that a single component may be designed as multiple components or that multiple components may be designed as a single component.

Further, in the accompanying drawings and description that follow, like parts are indicated throughout the drawings and written description with the same reference numerals, respectively. Reference numerals corresponding to multiple instances of an element in a figure end with a lowercase alphabetic character (e.g., 104a, 104b, 104c) to specifically identify the different elements, while such elements can be identified collectively with the reference number (e.g., 104). The figures are not drawn to scale and the proportions of certain parts have been exaggerated for convenience of illustration.

DETAILED DESCRIPTION

Figure 1:
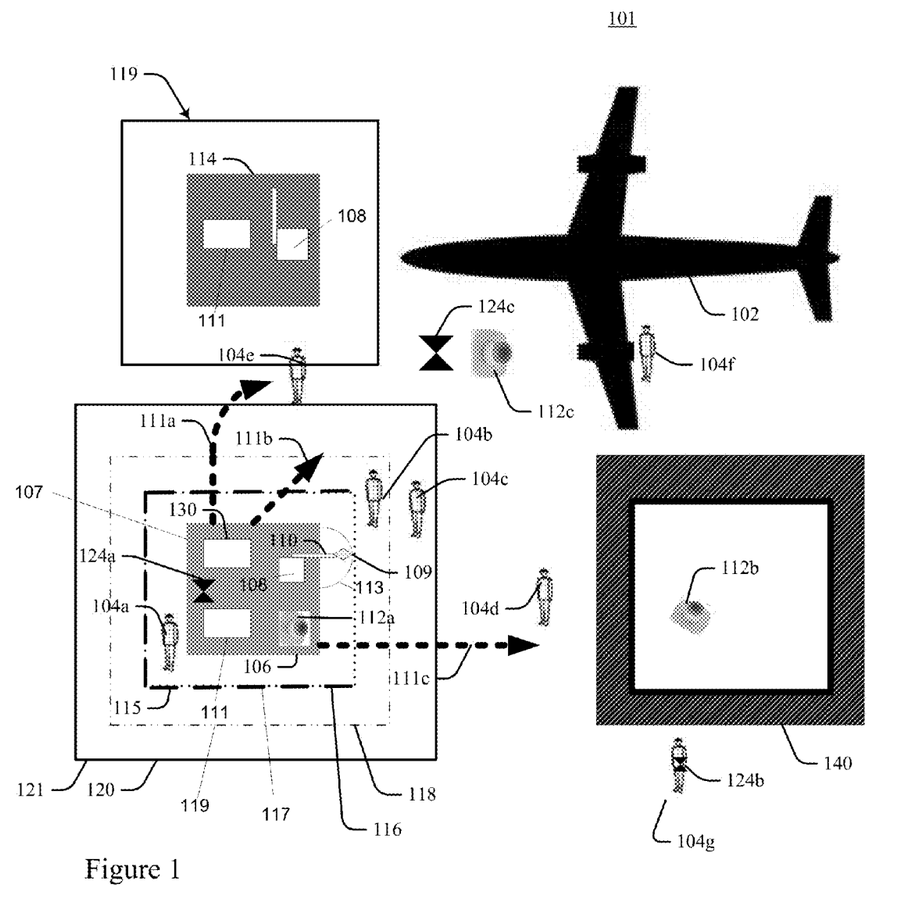
FIG. 1 is a graphical illustration of a workspace 101 including mobile workstations 106 according to the present teachings.

With reference to FIG. 1, an aircraft assembly workspace 101 for implementing the present teachings is shown. The assembly workspace 101 has sufficient size to accept workpiece 102, which in FIG. 1 is an aircraft having a fuselage and wings. The workspace 101 can be occupied by both humans 104a-g and an automated workstation 106 to simultaneously perform assembly or other manufacturing tasks on workpiece 102. For example, any one of a plurality of human operators 104a-g or the mobile automated workstation 106 can perform manufacturing tasks such as riveting, drilling, assembling, gluing, wiring, sanding, painting or installing parts at a variety of different locations around the workpiece 102. Further, both the human operators 104a-g and workstation 106 can perform their tasks simultaneously and in close proximity to one another. According to one aspect of the present teachings, the workstation 106 can perform tasks while under control by one or more individuals, such as humans 104, through automated processes or a combination of both.

According to one aspect of the present teachings, the mobile workstation 106 includes a base 107 on which robot 108 is mounted in order to perform manufacturing tasks on workpiece 102. The robot 108 can be a six-axis articulated robot 108. End-effector 109 is mounted to robot arm 110 and can perform various tasks on the workpiece 102. Various types of end-effectors 109 that can be mounted to the arm 110 include but are not limited to grippers, welding guns and elements, vacuum pumps, blowtorches, paint applicators, sanders, riveters, drills, and still other operative elements. The movement of the end effector 109 can define an envelope 113 in which any object within the envelope 113, such as a human 104, would come into contact with the end effector 109 or arm 110. Envelopes 113 can also be determined for the motion of any part of the workstation 106 or the entirety of the workstation 106. Actions of the robot 108 are controlled by robot controller 111, which can contain circuitry such as a computer processor for executing computer-readable instructions, a non-transient computer readable for storing and writing such instructions, a communications interface for transmitting instructions to and receiving information from the robot 108, and a power source for providing power to the robot 108. While a six-axis robot can have improved flexibility relative to robots with fewer degrees of freedom, robots 108 with fewer than six axes can also be implemented according to the present disclosure. Further, workstation 106 can include non-robotic machinery used to perform tasks on workpiece 102. For example, an automated mechanism or semi-automated mechanism requiring human control that performs tasks that can be performed by a robot 108 or human 104 can be included with workstation 106 according to the present teachings. As used herein, the term workstation 106 includes any robot 108 or other machinery mounted on or otherwise associated with the workstation 106 that performs the manufacturing tasks assigned to the workstation 106.

With further reference to FIG. 1, the mobile workstation 106 is self-propelled and can undertake translational motion throughout the workspace 101, for example along one of the paths 111a-c. The workstation 106 can be positioned at different locations around the workpiece 102, or otherwise within the workspace 101. The illustrated workstation 106 can utilize motorized steerable wheels to move around the workspace 101. The workstation 106 can alternatively be moved with other mechanisms, such as tracks placed at various locations around the workspace 101, sleds, tow-motor skid bases, or any other device or system than can move the workstation 106 around the workspace 101.

With continued reference to FIG. 1, the automated mobile workstation 106 includes an on-board computing device 130 that provides a computing environment that continuously receives and analyzes data according to the present teachings. It should be noted that computing device 130 need not be on-board the workstation 106, but can instead be placed remotely to the workstation 106. Examples of suitable computing devices 130 that can be configured to operate according to the present teachings include but are not limited to general purpose computers, computerized robot controllers, programmable logic controllers (PLC) or other computing devices. Sensors 112a-c can be provided on the mobile workstation 106 and detect objects in the workspace 101 disposed outwardly from workstation 106, such as sensor 112a, or in other locations remote from the mobile workstation 106, such as sensor 112b within a parking area 140, or sensor 112c disposed proximate to workpiece 102. Sensors 112b-c can detect a variety of objects in the workspace, including humans 104 and workstations 106 and 114. Illustrative but not exhaustive examples of sensors 112 include proximity sensors, visible light sensors, optical, laser, and infrared sensor devices. The sensors 112 can provide real-time data to the computing device 130 from which the computing device 130 can determine the position, presence, movement, acceleration, speed or velocity of any humans 104 or mobile workstations 106, 114 within the workspace 101. The real-time data can include a plurality of communication exchanges between the computing device 130 and the sensors 112a-c.

Based upon data received from one or more of sensors 112a-c, the computing device 130 determines an exclusionary volume 116 having an exclusionary surface 117. The computing device 130 can also determine a buffer volume 118 having a buffer surface 119, and a second buffer volume 120 having a second buffer surface 121. The exclusionary volume 116 can at least partially surround the workstation 106. For example, the exclusionary volume 116 can surround the workstation 106 except underneath the workstation since human 104 access into positions underneath the workstation 106 are highly unlikely or impossible due to the presence of the floor. Further, mitigating against humans 104 approaching the workstation 106 from certain directions may not be required by safety standards, rules, codes or regulations. Alternatively, the exclusionary volume 116 can completely surround the workstation 106. The buffer volume 118 at least partially surrounds the exclusionary volume 116, and the second buffer volume 120 at least partially surrounds the buffer volume 118. According to other aspects of the present teachings, the buffer volume 118 completely surrounds the exclusionary volume 116, the second buffer volume 120 completely surrounds the buffer volume 118, or both. According to one aspect of the present teachings, any point on the buffer surface 119 is further from the closest point on the workstation 106 than the point on the exclusionary surface 117 closest to the aforementioned point on the workstation. This criterion ensures that any point on the buffer surface 119 will have a point on the exclusionary surface 117 between the buffer surface 119 and the workstation 106. Similarly, any point on the second buffer surface 121 is further from the closest point on the workstation 106 than the point on the buffer surface 119 closest to the point on the workstation.

Physical boundary 115 prevents humans from entering the exclusion volume 116 or breaching the exclusion surface 117. Suitable forms of physical boundaries 115 include but are not limited to barriers, rails or walls. Further, such physical boundaries 115 can coincide with one or more of the exclusionary surface 117, buffer surface 119 and second buffer surface 121. Alternatively, physical boundary can be mounted to workstation 106 at any suitable location, whether or not coinciding with exclusionary surface 117, buffer surface 119 or second buffer surface 121.

According to one aspect of the present teachings, the exclusionary volume 116 and surface 117, buffer volume 118 and surface 119, and second buffer volume 120 and surface 121 are all determined dynamically, including but not limited to those times during which the workstation 106 moves relative to the workspace 101, whether that motion is the workstation 106 moving throughout the workspace 106, or the robot 108 mounted to the workstation 106 moving while the workstation 106 is stationary with respect to the workspace 101. As used herein, motion of the workstation 106 can include the motion of the entire workstation 106 throughout the workspace 101, such as when the base 107 and robot 108 moves throughout the workspace, or motion of part of the workstation 106 with respect to the workspace 101, such as when the base is momentarily stationary and robot 108 is in motion relative to the workspace 101. Further, the term "mobile workstation" 106 denotes that the entire workstation 106 is moveable relative to the workspace 101.

The computing device 130 can activate indicators 124a-c as a result of a human 104 detected within one of the exclusionary volume 116, buffer volume 118 and second buffer volume 120, or as a result of breaching the exclusionary surface 117, buffer surface 119 and second buffer surface 121. While the illustrated exclusionary volume 116, buffer volume 118 and second buffer volume 120 have cubic shape and exclusionary surface 117, buffer surface 119 and second buffer surface 121 have rectangular shape, a wide variety of shapes of volumes and corresponding surfaces are possible according to the present disclosure. Indicator 124a is located on the workstation 106, indicator 124b is worn by human 104g and indicator 124c is located in a location in the workspace 101 such that it can communicate warnings to the humans 104 to alert them to a hazardous condition presented by the workstation 106. For example, an indicator 124 can be an alarm that is audible, visual or in the case of indicator 124b can vibrate, or a combination of the foregoing. According to another aspect of the present teachings, an indicator 124b located on human 104g can provide multiple functions, including providing sensor location data to the computing device 130.

A plurality of differentiated alarms can be activated by the computing device 130 in response to various breaches of exclusionary volume 116 and surface 117, buffer volume 118 and surface 119, and second buffer volume 120 and surface 121. Detection of a human 104 within any of the exclusionary volume 116, buffer volume 118, and second buffer volume 120 or breaching the exclusionary surface 117, buffer surface 119 and second buffer surface 121 can also result in the computing device 130 altering the motion of the workstation 106. For example, under such circumstances the workstation 106 can slow its movement, restrict certain ranges of motion, or come to a complete stop based on a determination that a human is within any one or more of the exclusionary volume 116, buffer volume 118, and second buffer volume 120 or breaching the exclusionary surface 117, buffer surface 119 and second buffer surface 121. In one example the indicators 124 can display green lights indicating a safe or "all-clear" condition where all humans 104 are outside of the exclusion and buffer volumes and have not breached the exclusion and buffer surfaces and can continue to work safely without taking any action. A "caution" alarm condition can be triggered by the presence of human 104c within the second buffer volume 120 (but not within the buffer volume 118). Such conditions can also result in the workstation 106 slowing down or otherwise altering its movement. A "heightened alert" alarm condition can be triggered by the presence of human 104b within the buffer volume 118 (but not within the exclusion volume 116). Such conditions can also, for example, result in the workstation 106 further slowing down or stopping. The "high alert" alarm condition can be triggered by the presence of the human 104a within the exclusionary volume 116. Such condition can also result in, for example, the workstation 106 stopping completely. The "caution" alarm, "heightened alert," and "high alert" alarms can be differentiated by implementing different color coding for visible alarms effected by indicators 124 or different sounds for audible alarm effected by indicators 124.

With continued reference to FIG. 1, parking area 140 is a portion of the workspace 101 in which the mobile workstation 106 can move to and enter a parking state in which no work is performed on the workpiece 102 and humans 104 are permitted to enter or be found in exclusionary volume 116 and surface 117, buffer volume 118 and surface 119, and second buffer volume 120 and surface 121 without activation of any of the corresponding alarms or change in movement of the workstation 106. A parking area 140 can alternatively be defined as any location within the workspace 101 at which the workstation 106 executes parking instructions wherein the workstation 106 ceases any movement or operation and allows humans 104 to approach without activating any corresponding alarms.

In another aspect of the present teachings, the system described herein can also activate one or more of indicators 124 and alter workstation 106 movement in the event a separate workstation 114, or a zone 150 surrounding such a workstation 114, is found within exclusionary volume 116, buffer volume 118 or second buffer volume 120 or breaches exclusionary surface 117, buffer surface 119 or second buffer surface 121.

Figure 2:
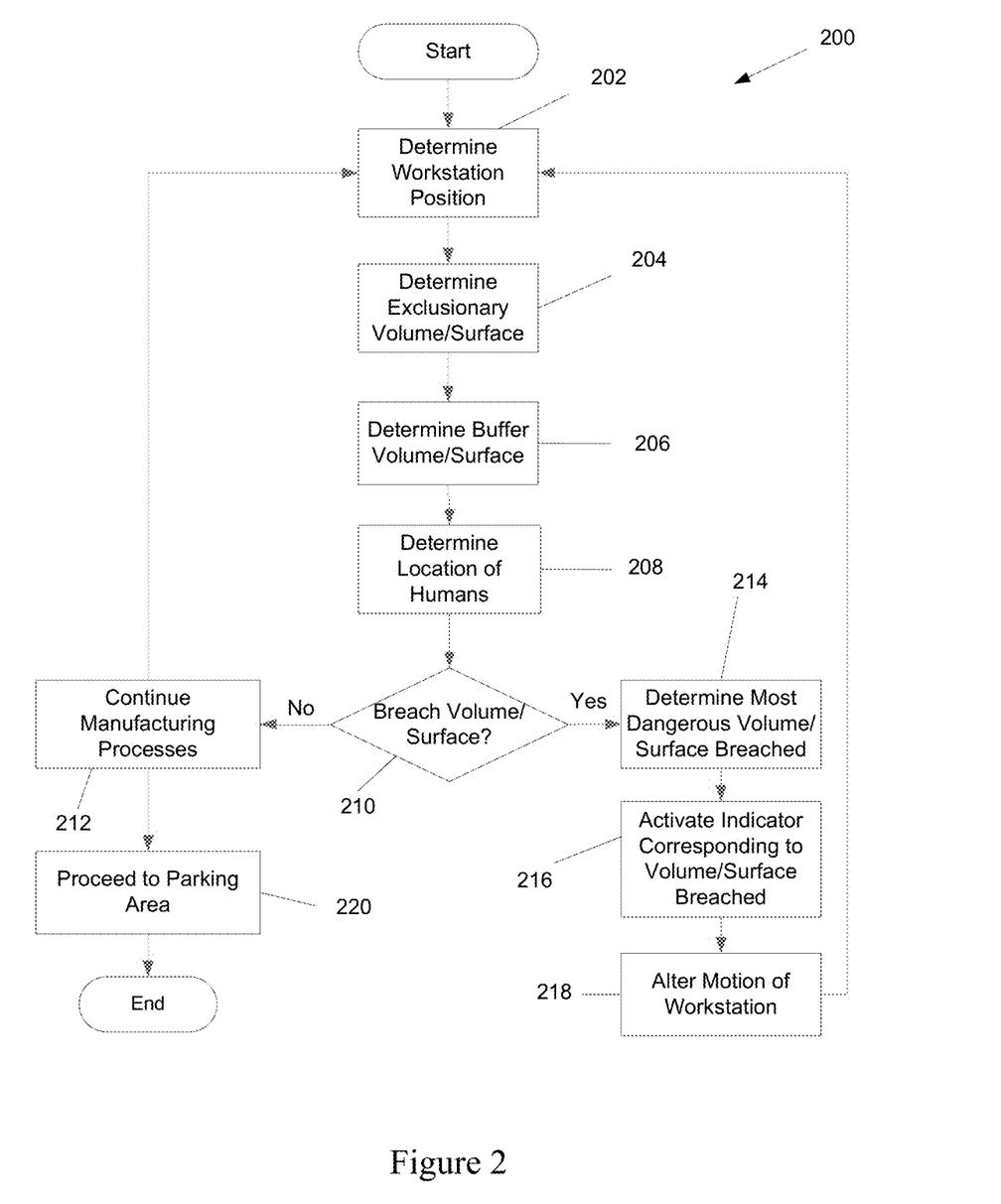
FIG. 2 is a block diagram of process 200 for providing for human safety in automated manufacturing environments including mobile workstations 106.

With reference to FIG. 2, process 200 for providing for human safety in a workspace 101 includes determining the location of a mobile workstation 106 in a workspace 101 with a computing device 130 at step 202. Such determination can occur by receiving data from one of sensors 112a-c at the computing device 130. According to one aspect of the present teachings, the sensors 112a-c have sufficient sensitivity to provide data sufficient to determine the positioning of the mobile workstation 106 and any robot 108 or other machinery included with the workstation 106 relative to the workspace 101. According to other aspects of the present teachings, data regarding the robot's 108 position can be determined by receiving data from the robot controller 111 which includes the data regarding the various degrees of freedom of the robot 108. Such information can be used with sensor information 212a-c to accurately determine the position of the workstation 106.

In step 204, an exclusionary volume 116, exclusionary surface 117, or both are determined by the computing device 130. In step 206, a buffer volume 118, buffer surface 119 or both are determined by the computing device 130. Steps 204 and 206 can be performed continuously, updating any one or more of the exclusionary volume 116 and surface 117, buffer volume 118 and surface 119 during operation or movement of the workstation 106. The buffer volume 118 and buffer surface 119 need not be determined after determining one or both of the exclusionary volume 116 or exclusionary surface 117, but can instead be determined before, after or during step 202. Further, any additional buffer volumes and surfaces, such as second buffer volume 120 and second buffer surface 121 can also be determined before, during or while any one or more of the exclusionary volume 116 or exclusionary surface 117, buffer volume 118 and buffer surface 119 or any other buffer volume or surface are determined.

It should be noted that the exclusionary volume 116 and surface 117, buffer volume 118 and surface 119 and any additional buffer volumes and surfaces, such as second buffer volume 120 and surface 121 need not be defined with respect to the workspace 101, but can be defined with respect to any frame of reference that can be applied to human occupants 104 or workpiece 102 within the workspace 101. The exclusionary volume 116 and surface 117, buffer volume 118 and surface 119, and any additional buffer volumes and surfaces such as second buffer volume 120 and surface 121 can be found in locations outside the mobile workstation 106 in the workspace 101. Any one or more of the exclusionary volume 116 and surface 117, buffer volume 118 and surface 119, and additional buffer volumes and surfaces can be defined based on one or more safety rules specified within, defined by or derived from a variety of sources, including local, federal or other governmental entities' safety codes or regulations, as well as codes or standards promulgated by non-governmental organizations (for example, the National Fire Protection Association (NFPA), the International Standards Organization (ISO), the Occupational Safety and Health Administration (OSHA) of the United States Department of Labor, etc.). According to one aspect of the present teachings, one or more of the exclusionary volume 116 and surface 117, buffer volume 118 and surface 119, and additional buffer volumes and surfaces can be defined to safely enable humans 104 and mobile workstations 106 to occupy adjacent areas in the workspace 101 and perform tasks related to the workpiece 102, such tasks including manufacturing, assembly and other operations performed on the workpiece 102. In one aspect of the present teachings any one or more of the exclusionary volume 116 and surface 117, buffer volume 118 and surface 119, and any additional buffer volumes and surface can be defined by those portions the workspace 101 encompassing an envelope, such as envelope 113. Such envelopes can in turn be defined by the predetermined range of motion or possible motion to be undertaken by the workstation 106, including any robots 108 or other machinery on the workstation 106. According to one aspect of the present teachings, the exclusionary volume 116 and surface 117 define limits for the workstation 106 to operate or move safely according to selected safety standard, codes, regulations or rules. One or more of the exclusionary volume 116 and surface 117, buffer volume 118 and surface 119, and any additional buffer volume and surface can be selected to prevent or mitigate injuries to humans 104. According to another aspect of the present teachings, physical boundaries 115 such as barriers, rails or walls can coincide with one or more of the exclusionary surface 117, buffer surface 119 and second buffer surface 121.

With further reference to FIG. 2, at step 208 the computing device 130 analyzes sensor 112*a-c* data to determine the location of human 104 occupants within the workspace 101. In step 210, the computing device 130 determines whether any humans 104 within the workspace 101 have breached any of the exclusionary volume 116 and surface 117 or buffer volume 118 and surface 119. If the computing device 130 determines that no breach has occurred, the workstation 106 continues to perform its manufacturing tasks in step 212. For example, the workstation 106 can initiate or continue manufacturing or assembly or other operations or tasks on the workpiece 102, or the workstation 106 can move to another location in the workspace area 101.

If the computing device 130 determines that a breach has occurred, in step 214 the computing device 130 determines which of the exclusionary volume 116 and surface 117, and buffer volume 118 and surface 119 have been breached. In step 216, the computing device 130 activates an indicator 124 corresponding to the volume or surface breached in step 214, and in step 218 alters the motion of the workstation 106. According to one aspect of the present teachings, the type of indicator 124 activated in step 216 and the type of altered motion undertaken in step 218 can depend on the volume or surface or both that are breached. For example, if all of the exclusionary volume 116 and surface 117, and buffer volume 118 and surface 119 have been breached, then the indicators 124*a-c* can activate an alarm corresponding to a breach of the exclusionary volume 116 or exclusionary surface 117 or both as such as breach can have greater potential for injury to human than a breach of only the buffer volume 118 or buffer surface 119. According to another aspect of the present teachings, steps 216 and 218 can include activating an audible alarm associated with the volume or surface that has been breached and the workstation 106 can come to a halt until the process 200 continues and determines that there is no longer a breach.

In one aspect of the present teachings, the computing device 130 can allow for exceptions in which one or more of the exclusionary volume 116 and surface 117, buffer volume 118 and surface 119, and any additional buffer volumes and surfaces, such as buffer volume 120 and surface 121, can be violated but steps 214 and 216 are bypassed, permitting the workstation to continue its manufacturing tasks. For example, a paint technician can occupy a control station positioned within exclusion volume 116 and manually bypass steps 214 and 216 by, for example inserting a password at a keypad that is recognized by the computing device 130 or by carrying an RFID tag recognized by the computing device 130 which includes a RFID tag reader.

In step 220, the computing device 130 directs the workstation 106 to proceed to parking area 140, where the workstation 106 can be powered down and can allow humans 104 to approach the workstation 106 without activation of an indicator 124*a-c*, for example to maintain or repair the workstation 106. In another aspect the present teachings, the workstation 106 can be placed into a parking state independent of its location within the workspace 101, thus effectively providing a wide range of available locations in which to enter a parked state.

Aspects of the present teachings, including the steps shown in FIG. 2 can be implemented by executing computer program instructions with computing device 130. The steps of process 200 shown in FIG. 2 can be written in one or more computer-readable and executable instructions. Further, the steps of process 200 can be performed in a sequence different than that depicted in process 200. For example, two steps of process 200 shown in succession can be executed substantially concurrently or in an order opposite to that depicted.

Figure 3:
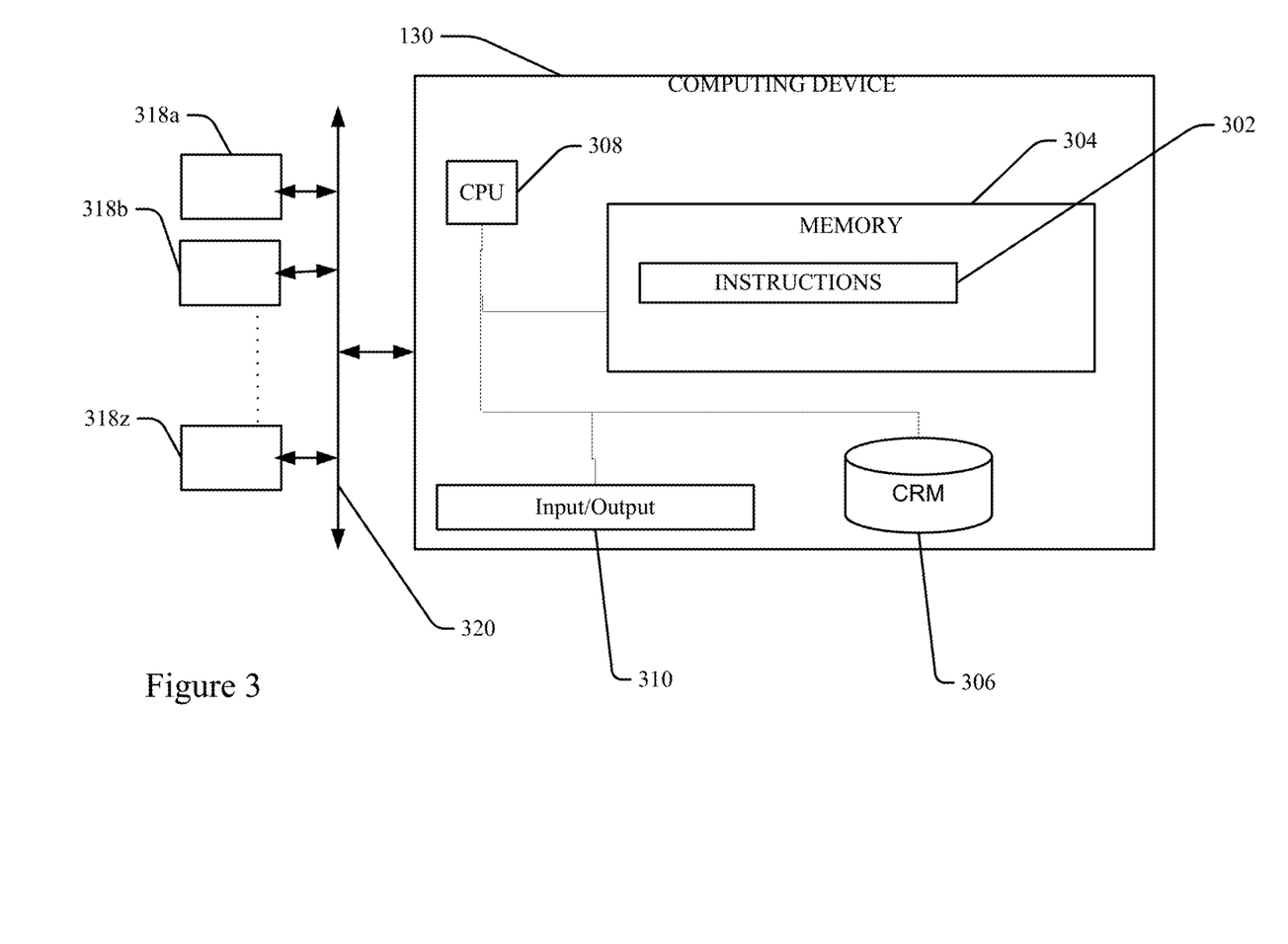
FIG. 3 is a block diagram illustration of a computing device 130.

With reference to FIG. 3, computing device 130 includes instructions 302 that reside on non-transient computer readable memory 304, or on a non-transient computer readable storage medium 306. Such instructions 302, when executed a central processing unit (CPU) 308 can perform the methods described herein, for example as described in connection with FIG. 2. Input-output (I/O) device 310 is configured to receive data from a plurality of workspace 101 data sources 318*a-z*, such as sensors 212*a-c* shown in FIG. 1, through network infrastructure 320.

Any combination of one or more non-transient computer readable medium(s) 306 or memories 304 or both can be implemented according to the present teachings. A computer readable storage medium 306 can be, without limitation, an electronic, magnetic, optical, electromagnetic, infrared, or semiconductor system, apparatus, or device, or any suitable combination of the foregoing. Additional example of non-transient computer readable medium(s) 306 or memories 304 include, but are not limited to portable computer diskettes, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Instructions 302 can be written in computer program code for carrying out aspects of the present teachings. Instructions 302 can be written in any combination of one or more programming languages, including object oriented programming languages such as Java, Smalltalk, C++, and conventional procedural programming languages, such as the "C" programming language. In addition to executing instructions and receiving data at a single computing device 130, such tasks can be performed by a distributed computing device, which can communicate with the workstation 106, robot controller 111, sensors 112*a-c* or other aspects of the present teachings through a computer network, including a local area network (LAN) or a wide area network (WAN).

A plurality of additional computing devices 130 can be installed in the workstation 106 and/or remotely to monitor input data, providing redundant computing capability. The sensors 112*a-c* can also be provided in a redundant arrangement, so that if any sensors 112*a-c* fail others can continue to monitor and collect data from the workspace 101.

As used herein, the singular forms "a", "an" and "the" are intended to include the plural forms as well, unless the context clearly indicates otherwise. Certain examples and elements described in the present teachings, including in the claims and as illustrated in the Figures, may be distinguished or otherwise identified from others by unique adjectives (e.g., a "first" element distinguished from another "second" or "third" of a plurality of elements, a "primary" distinguished from a "secondary" one or "another" item, etc.) Such identifying adjectives are not to be construed to limit the claims to any specific illustrated element, or to imply any precedence, ordering or ranking of any claim elements, limitations or process steps. Many modifications and variations of the present teachings will be apparent without departing from the scope of the claimed invention.

What is claimed is:

1. A computer-implemented method for operating mobile automated workstations comprising:
defining with a computer device an exclusionary volume having an outer exclusionary surface at least partially surrounding a mobile workstation operably disposed in a workspace;
defining a buffer volume having an outer buffer surface with the computer device, the buffer surface at least partially surrounding the mobile workstation and the exclusionary volume, wherein a point on the buffer surface is further from a point on the workstation closest to the point on the buffer surface than a point on the exclusionary surface closest to the point on the workstation;
receiving data at the computer device from at least one sensor;
determining a location of the workstation within the workspace with the computer device based on the data;
determining a location of a human within the workspace with the computer device based on the data; and,
performing at least one of activating an indicator with the computer device and altering predetermined movement of the mobile workstation with the computer device after detection of at least one of the human overlapping the exclusionary volume and crossing the exclusionary surface.

2. The method of claim 1, wherein at least one of the step of defining an exclusionary volume and defining a buffer volume is based upon at least one of a safety standard or governmental regulation.

3. The method of claim 1, wherein the step of defining an exclusionary volume and the step of defining a buffer volume occur prior to a predetermined motion of the workstation and the exclusionary volume and buffer volume enclose an envelope defined by the predetermined motion of the workstation.

4. The method of claim 1, further comprising:
performing at least one of activating a second indicator with the computer device and altering predetermined movement of the mobile workstation with the computer device after detection of at least one of the human overlapping the buffer volume and crossing the buffer surface.

5. The method of claim 1, wherein the step of defining an exclusionary volume is based upon at least one of a safety standard or governmental regulation.

6. The method of claim 1, wherein the step of defining an exclusionary volume is performed while the workstation undertakes translational motion relative to the workspace.

7. The method of claim 1, wherein the defining step occurs prior to a predetermined motion of the workstation and the exclusionary volume encloses an envelope defined by the predetermined motion of the workstation.

8. The method of claim 1 wherein the performing step includes performing both activating an indicator with the computer device and altering predetermined movement of the mobile workstation with the computer device after detection of at least one of the human overlapping the exclusionary volume and crossing the exclusionary surface.

9. A system for operating mobile automated workstations comprising:
a mobile workstation translatably disposed within a workspace configured to accept a workpiece;
a processor and a tangible computer-readable medium including instructions that upon execution by the processor:
define an exclusionary volume having an outer exclusionary surface at least partially surrounding the mobile workstation operably disposed in the workspace;
define a buffer volume having an outer buffer surface at least partially surrounding the mobile workstation and the exclusionary volume, wherein a point on the buffer surface is further from a point on the workstation closest to the point on the buffer surface than a point on the exclusionary surface closest to the point on the workstation;
determine a location of the workstation within the workspace based on data received from at least one sensor disposed at a location remote from the mobile workstation;
determine a location of a human within the workspace based on the data received from the at least one sensor; and,
perform at least one of activating an indicator, and altering predetermined movement of the mobile workstation after detection of at least one of the human overlapping the exclusionary volume and crossing the exclusionary surface.

10. The system of claim 9 wherein at least one of the instructions that upon execution by the processor define a buffer volume and the instructions that upon execution by the processor define an exclusion volume is based upon a safety standard or governmental regulation.

11. The system of claim 9 wherein the instructions that upon execution by the processor define an exclusion volume are based upon a safety standard or governmental regulation.

12. The system of claim 9 further including the at least one sensor mounted on the workstation and configured to detect the position of the workstation within the workspace.

13. The system of claim 12 wherein the at least one sensor is configured to detect the position of at least one human occupant of the workspace.

14. The system of claim 9 wherein tangible computer-readable medium further includes instructions that upon execution by the processor define an exclusionary volume enclosing an envelope defined by a predetermined motion of the workstation.

15. A computer program product for operating mobile automated workstations comprising:
a tangible computer-readable medium including instructions that upon execution by a processor:
define an exclusionary volume having an outer exclusionary surface at least partially surrounding a mobile workstation operably disposed in a workspace;
define a buffer volume having an outer buffer surface at least partially surrounding the mobile workstation and the exclusionary volume, wherein a point on the buffer surface is further from a point on the workstation closest to the point on the buffer surface than a point on the exclusionary surface closest to the point on the workstation;
determine a location of the workstation within the workspace based on data received from at least one sensor disposed at a location remote from the workstation;
determine a location of a human within the workspace based on the data received from the at least one sensor; and,
perform at least one of activating an indicator and altering predetermined movement of the mobile workstation after detection of at least one of the human overlapping the exclusionary volume and crossing the exclusionary surface.

16. The system of claim 15 wherein at least one of the instructions that upon execution by the processor define a buffer volume and the instructions that upon execution by the processor define an exclusion volume is based upon a safety standard or governmental regulation.

17. The system of claim 15 wherein the instructions that upon execution by the processor define an exclusion volume is based upon a safety standard or governmental regulation.

18. The system of claim 15 wherein tangible computer-readable medium further includes instructions that upon execution by the processor define an exclusionary volume enclosing an envelope defined by a predetermined motion of the workstation.

19. The system of claim 15, wherein the tangible computer-readable medium further includes instructions that upon execution by the processor activate a second indicator and alter predetermined movement of the mobile workstation after detection of at least one of the human overlapping the buffer volume and crossing the buffer surface.

20. The method of claim 9, further comprising:
performing at least one of activating a second indicator with the computer device and altering predetermined movement of the mobile workstation with the computer device after detection of at least one of the human overlapping the buffer volume and crossing the buffer surface.

* * * * *